United States Patent [19]

Andoh et al.

[11] Patent Number: 4,570,876

[45] Date of Patent: Feb. 18, 1986

[54] TAPE END DETECTING DEVICE

[75] Inventors: Toshihiro Andoh, Higashiosaka; Tatsuya Kondo, Kyoto; Akira Toguchi, Daito, all of Japan

[73] Assignee: Sanyo Electric Co., Ltd., Osaka, Japan

[21] Appl. No.: 709,258

[22] Filed: Mar. 7, 1985

[30] Foreign Application Priority Data

Mar. 9, 1984 [JP] Japan .............. 59-34291[U]

[51] Int. Cl.⁴ .................................... B65H 63/00
[52] U.S. Cl. ..................................... 242/188; 226/11; 226/24; 242/57; 360/74.6
[58] Field of Search ............ 242/186, 188, 57; 226/10, 11, 24, 42, 43, 45; 360/74.6, 74.5, 74.1; 340/675

[56] References Cited

U.S. PATENT DOCUMENTS

| | | | |
|---|---|---|---|
| 3,539,084 | 11/1970 | Bradshaw | 242/57 X |
| 3,642,226 | 2/1972 | Tokunaga | 242/57 X |
| 3,694,585 | 9/1972 | Goldner | 242/188 X |
| 3,696,981 | 10/1972 | Levy | 226/11 |
| 3,834,649 | 9/1974 | Papay | 242/57 X |
| 3,861,619 | 1/1975 | Wolff | 242/188 |
| 4,091,426 | 5/1978 | Umeda | 242/188 X |
| 4,111,378 | 9/1978 | Barwick | 242/57 |
| 4,343,024 | 8/1982 | Kawai | 242/188 X |
| 4,492,993 | 1/1985 | Otis | 242/188 X |

*Primary Examiner*—Stanley N. Gilreath
*Attorney, Agent, or Firm*—Armstrong, Nikaido, Marmelstein & Kubovcik

[57] ABSTRACT

A device for use in a tape driving apparatus for detecting the tape end made of transparent material, comprising means for generating signals consisting of a first output and a second output having a delay time behind the first output, a device for emitting light upon the existence of the second output, a sensor for receiving the light emitting from the light emitting device through the tape end of transparent material, and a discriminating means for controlling, by means of the first output, the output supplied from the sensor during the existence of the second output, whereby the tape end is correctly detected without causing trouble in connection with extraneous light to be introduced from the outside.

3 Claims, 4 Drawing Figures a) oscillator output b) frequency divider output c) delay circuit output d) extraneous light level e) short counter output f) long counter output g) forward end sensor output h) 1st latch circuit output i) 2nd latch circuit output j) terminal end detecting circuit output

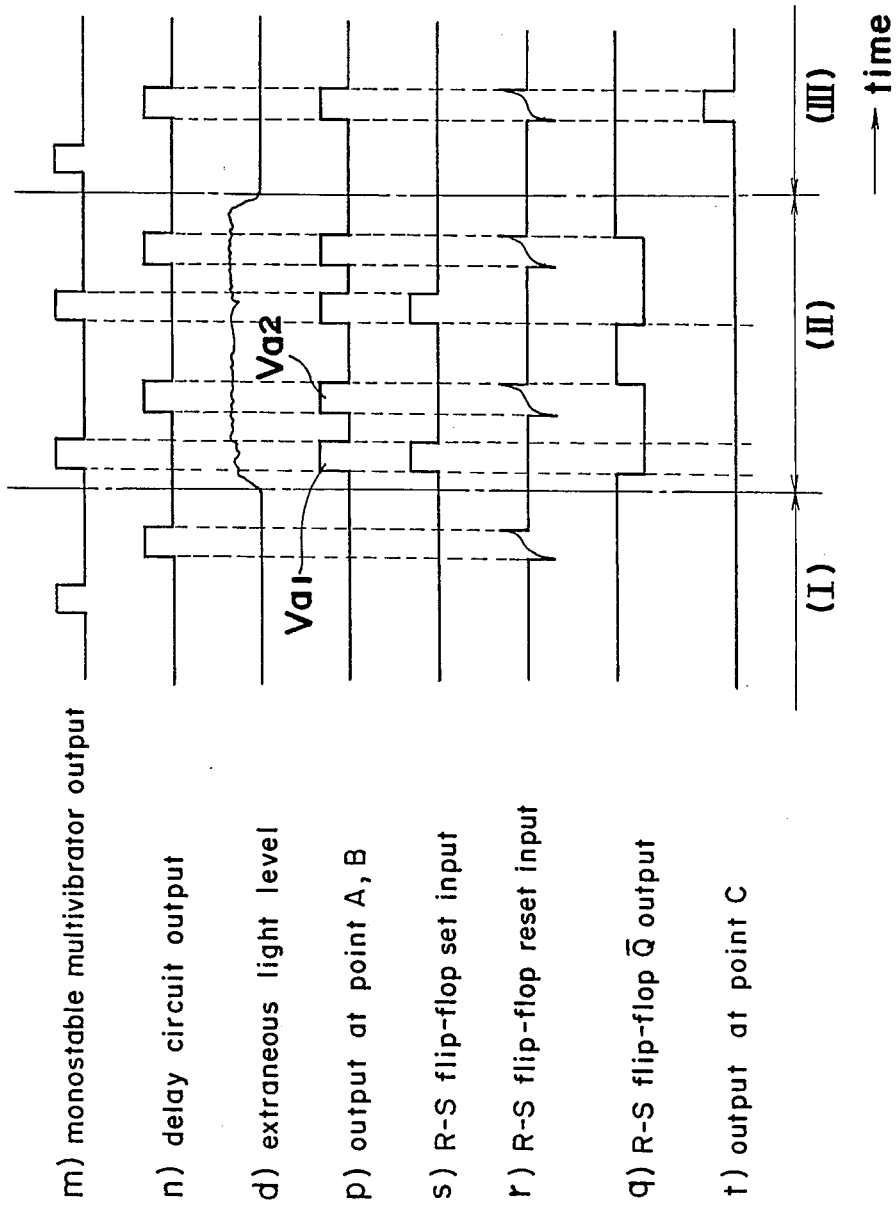

TAPE END DETECTING DEVICE

BACKGROUND OF THE INVENTION

1. Field of the Invention

The present invention relates to a tape end detecting device for use in a tape driving apparatus of a video tape recorder, and, more particularly, to a device for detecting the ends of tape which is transported for recording or reproducing on the middle, long portion made of magnetic, opaque material, and is stopped at both ends, short portions made of transparent material to be detected.

2. Description of the Prior Art

Recently, in a video tape recorder it has been proposed to provide a tape end detecting device comprising a light emitting device and a light receiving device provided at both sides of tape to be transported for receiving light emitting from the light emitting device and passing through the tape end made of transparent material within the light receiving device, in order to actuate a stop device for stopping the transportation of the tape at both its sides. However, such a tape end detecting device has the disadvantage of misoperating for the stop when receiving an extraneous light to be introduced occasionally from the outside within the light receiving device to actuate the stop device.

SUMMARY OF THE INVENTION

Accordingly, the present invention has been developed with a view to substantially eliminating the disadvantage inherent to the conventional device, and has for its essential object to provide an improved tape end detecting device which can operate to detect the tape end in the right manner without making trouble in connection with an extraneous light to be introduced from the outside into the cassette accommodating the tape therein.

In accordance with the preferred embodiment of the present invention, there is provided a tape end detecting device for use in a tape driving apparatus for detecting the tape end made of transparent material, comprising a cassette accommodating therein the tape to be transported by the tape driving apparatus, a control signal generating means for generating, in succession, signals consisting of a first output and a second output having a delay time behind the first output, a light emitting device for emitting light upon the existence of the second output from the control signal generating means, a sensor for receiving the light emitting from the light emitting device through the tape end of transparent material, and a discriminating means for controlling the output supplied from the sensor under the existence of the second output by means of the first output from the control signal generating means, said discriminating means including a first means for obtaining a first detecting signal upon the existence of the first output of the control signal generating means, a second means for obtaining a second detecting signal on the basis of the output supplied from the sensor during the existence of the second output from the control signal generating means, and a third means for controlling the supply of the second signal to the outside by means of the first signal.

According to another embodiment of the present invention, there is provided a device for use in a tape driving apparatus for detecting the tape end made of transparent material, comprising a cassette accommodating therein the tape to be transported by the tape driving apparatus, a control signal generating means for generating alternatively in succession a first output or a second output, a sensor for receiving light when generating both the first and second outputs, a light emitting device for emitting light when generating the second output at a position facing the sensor through the tape to be transported, and a discriminating means for providing an output when the sensor generates the output in synchronization with only the second output.

BRIEF DESCRIPTION OF THE DRAWINGS

These and other objects and features of the present invention will become apparent from the following description taken in conjunction with the preferred embodiments thereof with reference to the accompanying drawings, in which:

FIG. 4 shows a timing chart of waveform signals to be generated at respective portions of the circuit of FIG. 3.

DETAILED DESCRIPTION OF THE INVENTION

Figure 1:
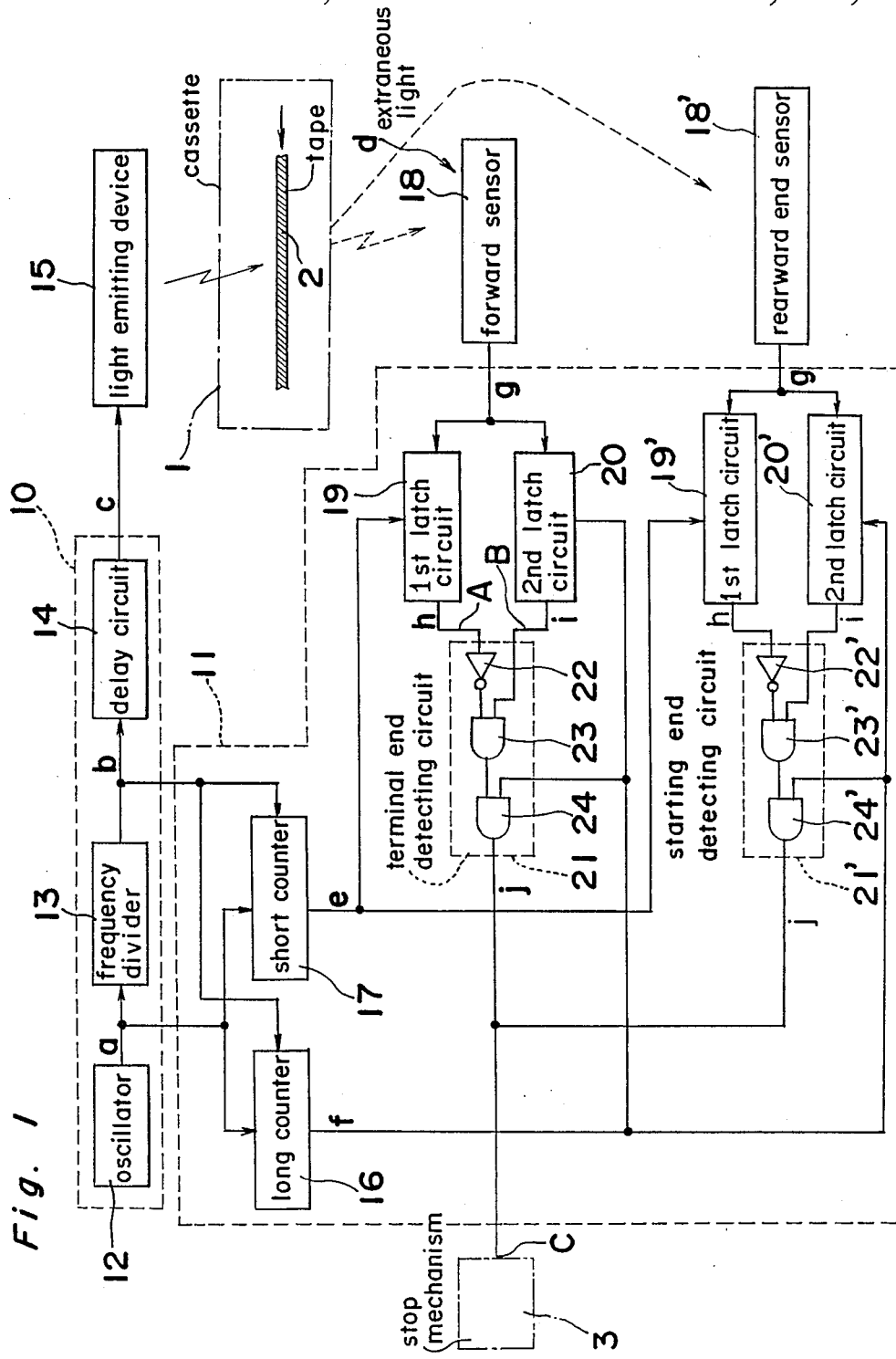
FIG. 1 is a block circuit diagram of a tape end detecting device to be employed in a tape driving apparatus according to one embodiment of the present invention.

Before the description of the present invention proceeds, it is to be noted that like parts are designated by like reference numerals throughout the accompanying drawings.

Referring to FIG. 1, there is shown a block circuit diagram of a tape end detecting device for detecting ends of a tape consisting of a long strip portion of magnetic, opaque material and a short sheet portion of transparent material provided at both ends of the strip portion, according to a first embodiment of the present invention, comprising a control signal generating means 10 including an oscillator 12, a frequency divider 13 and a delay circuit 14, a light emitting device (LED) 15, a pair of sensors 18, 18' for detecting the forward and rearward ends of tape 2 wound around and transported between a pair of reels to be provided within a cassette 1, and a discriminating means 11 including a long counter 16, a short counter 17, two sets of a pair of latch circuits 19, 20 and 19', 20', and a pair of circuits 21, 21' for detecting the terminal and starting ends of the tape each having a NOT gate 22, 22' and two AND gates 23, 24 and 23', 24', the output terminal C of the tape end detecting device being connected to a stop device 3 provided within a tape driving apparatus of a tape recorder.

Figure 2:
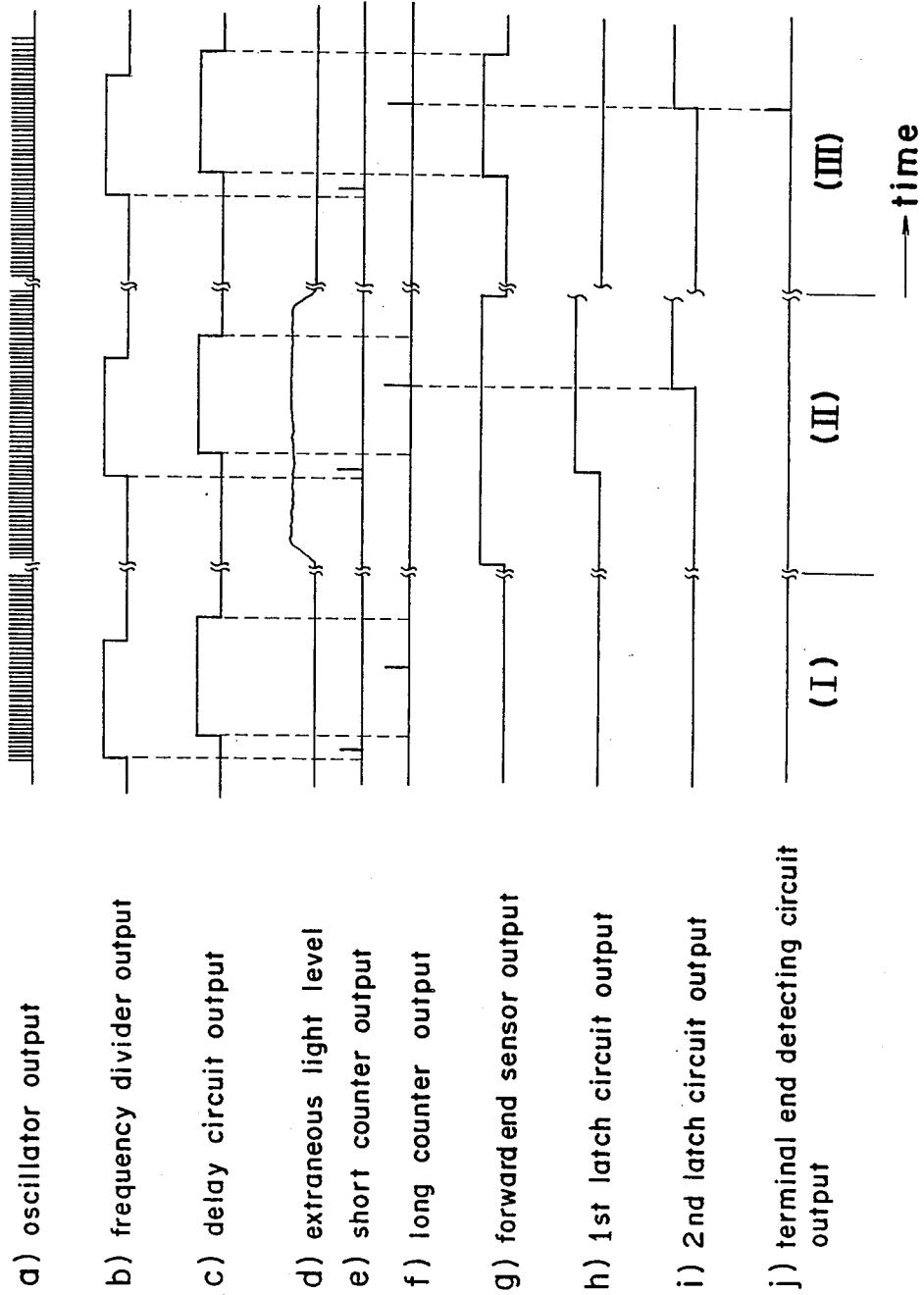
FIG. 2 shows a timing chart of waveform signals to be generated at specific portions of the circuit of FIG. 1.

In the control signal generating means 10, the oscillator 12 for generating a train of clock pulses as shown in (a) of FIG. 2 is connected in series with the delay circuit 14 through the frequency divider 13, both the outputs of the frequency divider 13 and the delay circuit 14 being shown with (b) and (c), respectively, of FIG. 2. The LED 15 is actuated by the output of delay circuit 14 to emit a light beam toward the pair of sensors 18, 18' through the tape 2 of cassette 1, both sensors being provided at the given positions capable of detecting the light of LED 15 passing through the forward or rearward ends of tape, respectively, which are made of transparent material.

In the discriminating means 11, the counters 16 and 17 are set to count each output of oscillator 12 and are reset by the output of frequency divider 13, and, in turn, the first latch circuits 19, 19' are triggered by the output of the short counter 17, as shown in (e) of FIG. 2, to latch the outputs of sensors 18, 18', while the second latch circuits 20, 20' are triggered by the output of the long counter 16, as shown in (f) of FIG. 2, to latch the outputs of sensors 18, 18'. Both of the outputs of first and second latch circuits 19, 19' and 20, 20' as shown in (h) and (i) in FIG. 2, at points A and B, are supplied into the terminal end detecting circuit 21, and the starting end detecting circuit 21' of which outputs are in turn supplied to the stop device 3, both the detecting circuits 21, 21' consisting of the NOT gates 22, 22' and two AND gates 23, 23' and 24, 24' to be adapted to output the signal of second latch circuit 20, 20' only when a logical matching of signals between the output of first latch circuit 19, 19' in low level L and the output of second latch circuit 20, 20' in high level H is established at one time.

With the above arrangement of device, it is to be designed such that the short counter 17 is adapted to output the counter-up signal to the first latch circuit 19, 19' during a period between the rising-up time of high level signal H generated by the frequency divider 13 and the rising-up time of the next high level signal H generated by the delay circuit 14, while the long counter 16 is adapted to output the counter-up signal to the second latch circuit 20, 20' during a period of time in which the delay circuit 14 has generated signal in high level H.

Within the cassette the tape 2 is adapted to transport between the reels by the driving apparatus in one direction to generate a signal of recording or reproducing as known in a conventional manner, and to stop by the stop device at the end of transparent material which is detected correctly by the tape end detecting device of the above arrangement without introducing the misoperation due to existence of extraneous light within the cassette.

In the control signal generating means 10 the delay circuit 14 is adapted to pass through the output of frequency divider 13 to the LED 15 with providing a certain delay time behind the time schedule with respect to the output of frequency divider 13. In other words, there is provided a certain period of time between the rising-up time of high level signal H generated from the frequency divider 13 and the rising-up time of the next high level signal H generated from the delay circuit 14 in order to provide a delay time for actuating the LED 15. Upon receiving the output of delay circuit 14, the LED 15 is actuated to emit light during a period of time in which the delay circuit 14 has generated signal in high level H. Accordingly, the sensor 18, 18' can receive the light of LED 15 through the end of tape 2 made of transparent material at the side of the tape opposite to the LED 15. However, the sensor 18, 18' does not receive the light of LED 15 through the recording strip of tape made of opaque material and, also, during a period of time in which the output of signal is not generated from the delay circuit 14 in low level L. But, it is noted that, if and when introducing extraneous light from the outside, the sensor 18, 18' is rendered to detect the light even when there is nonexistence of the light of LED 15.

In FIG. 2, a period of time (I) shows a state of recording or reproducing on tape in which the sensor 18, 18' is always faced to the opaque strip of tape 2 transporting in one direction without introducing extraneous light into the cassette 1, and another period of time (II) presents a state of introducing extraneous light into the cassette 1 which is detected by the sensor 18, 18' during the transporting of the opaque strip of tape 2. Also, a period of time (III) indicates the other state of detecting the end of tape 2 in which the sensor 18, 18' is faced with the transparent sheet of tape 2 in the condition of non-existence of extraneous light in the cassette 1, i.e., the sensor 18, 18' is rendered to actuate only by the light of LED 15 to be received through the transparent end of tape 2.

In the period of time (I), the output of signal from the sensor 18, 18' to the second latch circuit 20, 20' to be triggered by the long counter 16 is always maintained in low level L upon breaking off the light by the tape of opaque material so that the detecting circuit 21, 21' is adapted to output the signal of low level L to the stop device 3, thereby to render not to actuate the stop device 3.

In the period of time (II), the output of signal from the sensor 18, 18' to the first latch circuit 19, 19' to be triggered by the short counter 17 is rendered in high level H by the existence of extraneous light so that the detecting circuit 21, 21' is caused to output the signal of low level L to the stop device 3, thereby to render not to actuate the stop device 3.

However, in the period of time (III), the first latch circuit 19, 19' to be triggered by the short circuit 17 is always maintained in low level L at the point A without receiving any signal from the sensor 18, 18' which has not detected light emitting from the LED 15 until the LED 15 is actuated by the delay circuit 14 under the nonexistence of extraneous light, and the second latch circuit 20, 20' to be triggered by the long circuit 16 is rendered to latch the output of signal from the sensor 18, 18' in high level H at the point B which is detected through the transparent end of tape 2 emitting from the LED 15 actuated by the delay circuit 14, so that a logical matching of signals between the output of the first latch circuit 19, 19' in low level L and the output of the second latch circuit 20, 20' in high level H is established at one time to output the signal of the second latch circuit 20, 20' in high level H toward the stop device 3, whereby the stop device 3 is adapted to stop the transportation of tape 2 in the cassette 1. Accordingly, the tape 2 is correctly stopped only when detecting the transparent end of tape 2 by the tape end detecting device without providing the misoperation of extraneous light to be entered from the outside into the cassette 1.

Figure 3:
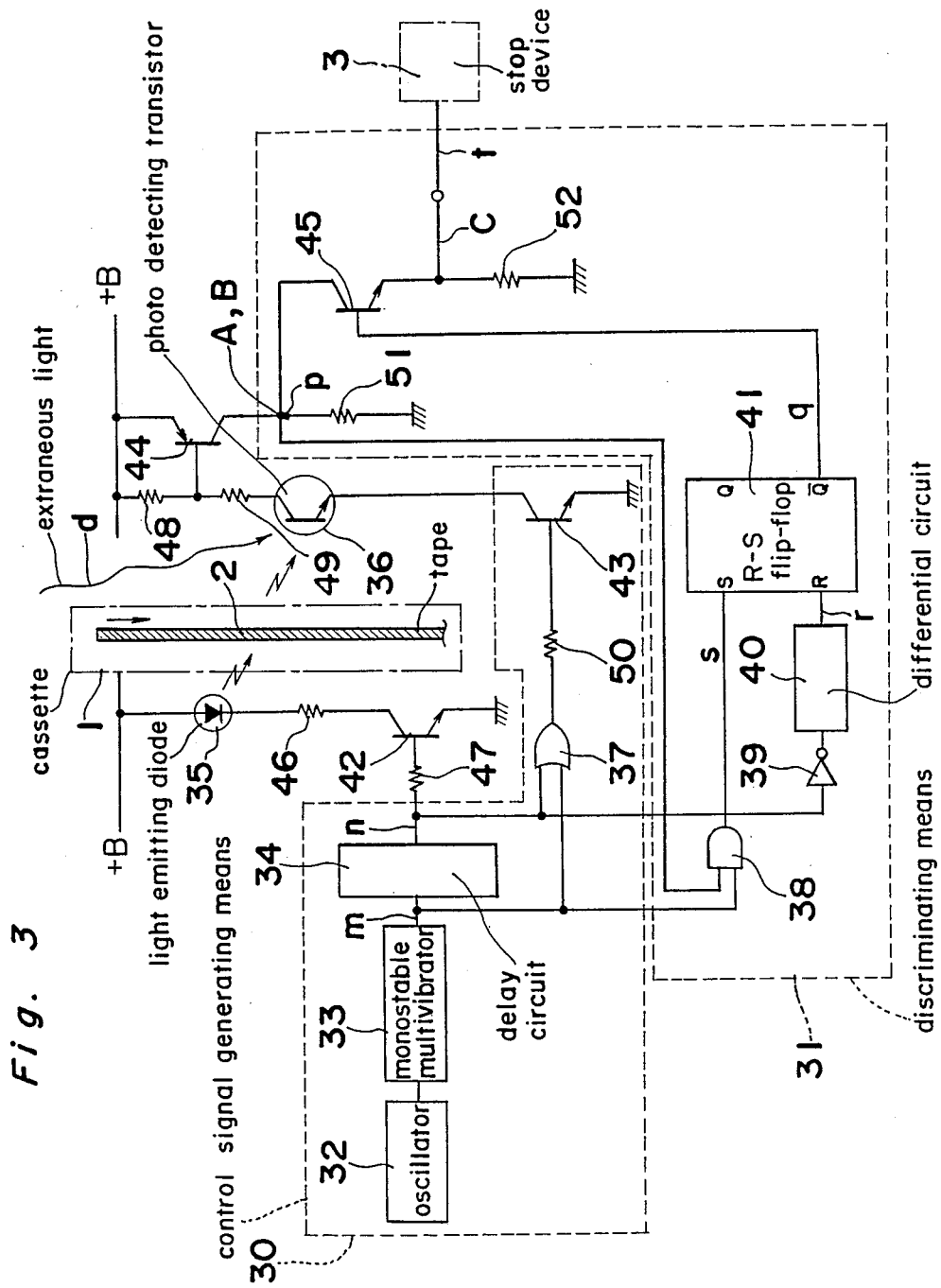
FIG. 3 is a block circuit diagram of a tape end detecting device to be employed in a tape driving apparatus according to another embodiment of the present invention.

The tape end detecting device, in another embodiment of the present invention, will be arranged with an analog circuit unit as shown in FIGS. 3 and 4.

Referring to FIG. 3, there is shown a circuit diagram of a tape end detecting device, according to a second embodiment of the present invention, comprising a control signal generating means 30 including an oscillator 32, a first monostable multivibrator 33 and a delay circuit 34 including a pair of second monostable multivibrators 34, a discriminating means 31 including a differential circuit 40 and an R-S flip-flop 41, a light emitting device (LED) 35, and a photodetector (PD) 36.

The first monostable multivibrator 33 is connected at its input end with the oscillator 32, which is generating signals having oscillating frequency f, and at its output end m with the delay circuit 34, which is operated as a delaying circuit for outputting signals delayed by a certain time to the signals of the first monostable multivibrator 33. The output end n of the delay circuit 34 is connected to the base of a first transistor 42 through a resistor 47, of which emitter is connected to the ground and collector is connected to a B-power supply +B through the LED 35, consisting of a light emitting diode 35, and a resistor 46. Both the output ends m, n of the first monostable multivibrator 33 and the delay circuit 34 are connected to the input side of an OR gate 37, the output end of which being connected to the base of a second transistor 43 through a resistor 50. The second transistor 43 is connected at the emitter to the ground and at the collector to the B-power supply +B through a pair of resistors 48, 49 connected in series and the PD consisting of a photo detecting transistor 36. The connecting point of the pair of resistors 48, 49 is connected to the base of a third transistor 44, of which emitter is connected to the B-power supply +B, while the collector of which is connected to the input side of an AND gate 38, the ground through a resistor 51 and the collector of a fourth transistor 45. The photo detecting transistor 36 is connected at the emitter to the collector of the second transistor 43 and at the collector to the base of the third transistor 44 through the one 49 of resistors. The AND gate 38 is connected at the input side to the output side of the first monostable multivibrator 33 and the collector of the third transistor 44, and at the output side to the set input S of the R-S flip-flop 41 having two inputs of set S and reset R and two outputs of Q and $\overline{Q}$. The reset input R of the R-S flip-flop 41 is connected to the output side of the delay circuit 34 through a NOT gate 39 and the differential circuit 40 of conventional type, while the $\overline{Q}$ output of the R-S flip-flop 41 is connected to the base of the fourth transistor 45. The emitter of the fourth transistor 45 is connected to the ground through a resistor 52, and an output end for obtaining an output signal to be employed to drive an exterior device 3 such as a tape stop mechanism of a tape recorder.

In connection with the above circuit arrangement of FIG. 3, FIG. 4 shows a timing chart of signals to be obtained at the respective points m, n, p, s, r, f, t thereof in addition to a signal d of extraneous light introducing from the outside.

The operation of the above circuit constituting of the tape end detecting device will be explained hereinafter with reference to FIG. 4.

In the control signal generating means 30, the first monostable multivibrator 33 is outputting in succession a first output of pulse signals as shown in (m) of FIG. 4 upon receiving the signals of oscillating frequency from the oscillator 32, and the delay circuit 34 is outputting in succession a second output of pulse signals, as shown in (n) of FIG. 4, having a certain delay time with respect to the first output of the first monostable multivibrator 33. The first transistor 42 is conducted by the second output of the delay circuit 34 to make the LED 35 emitting light toward the photodetector 36.

Accordingly, the LED 35 is turned on in synchronization with the second output of the delay circuit 34. The second transistor 43 is conducted by either the first output or the second output of monostable multivibrator 33 and the delay circuit 34, through the OR gate 37, and at this time, if the photodetecting transistor 36 is conducted by the light of the LED 35, the third transistor 44 is conducted to output signal of high level H at a point A(B) connecting the collector of the third transistor 44 to the AND gate 38, resistor 51, the collector of the fourth transistor 45.

When the photodetecting transistor 36 has not received the light from the LED 35, the third transistor 44 is cut off to make the point A(B) in low level L. The R-S flip-flop 41 is adapted to set only when the first output is generated from the first monostable multivibrator 33 and, at the same time, the point A(B) is made in high level H. In other words, the R-S flip-flop 41 is brought into set only when the photodetecting transistor 36 is conducted by extraneous light d to be introduced occasionally from the outside. Also, the R-S flip-flop 41 is adapted to reset upon receiving the second output from the delay circuit 34 through the NOT gate 39 and differential circuit 40 with providing signals as shown in (q) of FIG. 4. Therefore, the R-S flip-flop 41 comes into reset by means of the down-shifting portion of the second output.

In FIG. 4, the range (I) shows a case in which an an extraneous light d is not detected by the photodetecting transistor 36 and the end of tape 2 is not entered into a position facing the photodetecting transistor 36. Also, the range (II) shows a case in which an extraneous light d is detected by the photodetecting transistor 36, and the range (III) presents a case in which the end of tape 2 is entered into a position facing the photodetecting transistor 36.

In the range (I), the photodetecting transistor 36 is not receiving any light from the outside, and the voltage at the point A(B) becomes low level L. Therefore, the R-S flip-flop 41 does not receive the set pulses to output the signal of high level H from the $\overline{Q}$ terminal, and the fourth transistor 45 is conducted under the condition of signal being in low level L at the point A(B), resulting in that a pulse of detecting the tape end is not provided at the output terminal T.

In the range (II), the point A(B) is brought into a state of high level H at every time of conducting the second transistor 43 upon receiving an extraneous light d within the photodetecting transistor 36 and, namely, the voltage at the point A(B) becomes high level H when generating the first and second outputs m, n at the same time. Accordingly, upon receiving set pulse identical to the first output m of the R-S flip-flop 41 is set by means of the up-rising portion of the first output and the output from the $\overline{Q}$ terminal thereof in low level L for a period of time between the up-rising portion of the first output m and the down-shifting portion of the second output n, resulting in that the fourth transistor 45 is not rendered to conduct and a pulse of detecting the tape end is not provided at the output terminal T like as the state of the range (I).

In the range (III), the photodetecting transistor 36 is conducted only by receiving light from the LED 35 under the state of non-existence of an extraneous light d to provide a signal of high level H at the point A(B) during the generation of the second output n, and the R-S flip-flop 41 does not receive a set pulse and the output terminal of $\overline{Q}$ thereof is brought into high level H to conduct the fourth transistor 45, resulting in that a pulse of detecting the tape end is provided only when providing a signal of high level H at the point A(B) upon the conducting of the fourth transistor 45.

In addition to the above three ranges (I), (II) and (III), there is the other case of entering the tape end into a position facing the photodetecting transistor and of the existence of an extraneous light d from the outside, wherein the stop device 3 is adapted to actuate by a reel rotation detecting device in a known manner. Accordingly, the tape end detecting device can detect the tape end in the right manner without providing misoperation by an extraneous light to be suddenly entered from the outside into the cassette.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A device for use in a tape driving apparatus for detecting the tape end made of transparent material, comprising a cassette accommodating therein the tape to be transported by the tape driving apparatus, a control signal generating means for generating in succession signals consisting of a first output and a second output having a delay time behind said first output, a light emitting device for emitting light upon the existence of said second output from said control signal generating means, a sensor for receiving the light emitting from the light emitting device through said tape end of transparent material, and a discriminating means for controlling the output supplied from said sensor during the existence of said second output by means of said first output from said control signal generating means.

2. The device as claimed in claim 1, wherein said discriminating means comprises a first means for obtaining a first detecting signal upon the existence of said first output of said control signal generating means, a second means for obtaining a second detecting signal on the basis of the output supplied from the sensor during the existence of the second output from said control signal generating means, and a third means for controlling the supply of the second signal to the outside by means of the first signal.

3. A device for use in a tape driving apparatus for detecting the tape end made of transparent material, comprising a cassette accommodating therein the tape to be transported by the tape driving apparatus, a control signal generating means for generating alternatively in succession a first output or a second output, a sensor for receiving light when generating both said first and second outputs, a light emitting device for emitting light when generating said second output at a position facing the sensor through the tape to be transported, and a discriminating means for providing an output when said sensor generates the output in synchronization with only said second output.

* * * * *